United States Patent Office 2,722,479
Patented Nov. 1, 1955

2,722,479

TRIISOOCTYL PHOSPHITE AND HERBICIDES CONTAINING SAME

Jesse Roger Mangham, Richmond, Va., assignor to Virginia-Carolina Chemical Corporation, Richmond, Va., a corporation of Virginia No Drawing. Application December 18, 1952, Serial No. 326,769

4 Claims. (Cl. 71—2.7)

This invention relates to compositions consisting essentially of alkyl phosphites or mixtures of two or more alkyl phosphites of the general formula $$(RCH_2O)_3P$$

in which R is a branched heptyl radical. In other words the compounds constituting the composition are tri-primary isooctyl phosphites or phosphorus triesters of primary isooctyl alcohol.

The invention embraces compositions in which the alkyl groups of all of the ester molecules are identical and compositions in which each ester molecule contains different alkyl groups and compositions consisting of mixtures of such ester molecules.

In practice the compositions are made by esterifying commercial isooctyl alcohol made by the so-called oxo synthesis. The isooctyl alcohol product of this process consists of a mixture of closely related isomeric branched-chain primary alcohols of the general formula $RCH_2OH$ in which R is a branched heptyl radical. The branching generally occurs in the 3, 4, and 5 positions and rarely if ever in the 2 position.

The compositions are useful as preemergence herbicides.

The triisooctyl phosphite compositions of my invention are characterized as being clear, colorless liquids of high boiling point possessing a mild, not unpleasant odor and being insoluble in and very slowly hydrolyzed by water. They are miscible with alcohol, acetone, benzene, ether, heptane, carbon tetrachloride and most of the common organic solvents. They are compatible with cellulose esters and ethers and with polyvinyl resins such as the polyvinyl esters of carboxylic and halogen acids, e. g. polyvinyl acetate and polyvinyl chloride and copolymerized vinyl acetate and vinyl chloride.

The ester or esters may be prepared by any one of several generally known esterification procedures, for example by reacting the primary isooctyl alcohol with phosphorus trichloride in an inert solvent and removing or neutralizing the hydrochloric acid liberated by the reaction.

The following is an illustrative specific example of the preparation.

791 grams (6.06 moles) of oxo process isooctyl alcohol was mixed with 1 liter of hexane and the solution was cooled to 15–20° C. A mixture of 275 grams (2 moles) of phosphorus trichloride in 1 liter of hexane was added with stirring over a period of 125 minutes, during which time anhydrous ammonia was bubbled into the reaction mixture at such a rate as to maintain the mixture basic. During the addition the temperature was not allowed to rise above 20° C. When addition of the phosphorus trichloride mixture was completed, the reaction mixture was allowed to warm to room temperature over a period of 30 minutes. After removal of ammonium chloride by filtration the mixture was stripped of volatile material to 140° C. at atmospheric pressure and then at 168° C./2 mm. The product was stirred with charcoal and filtered. The yield, 699.6 g., of triisooctyl phosphite represented 83.4% of the possible theoretical amount; B. P. 161–4° C./0.3 mm.; specific gravity at 20°/4° C., 0.891; $N_D^{20}$ c. 1.4498. Analysis.—Calcd. for $C_{24}H_{51}O_3P$: P, 7.41. Found: P, 7.42.

The following is illustrative of its herbicidal properties.

An emulsion composed of 25 parts by weight of the triisooctyl phosphite prepared as described above, 70 parts by weight of xylene and 5 parts by weight of an emulsifying agent, specifically a commercial product known as Atlox 1256, was sprayed on the ground prior to the sprouting of corn and soya beans mixed with turnips, morning glory and rye grass with the following results. Application of 2 pounds per acre of the triisooctyl phosphite killed 90% of the turnips, 50% of the morning glory and 25% of the rye grass without damage to the corn and soya beans. Application of 16 pounds per acre killed 90% of each of the turnips, morning glory and rye grass without damage to the corn and soya beans. Application of greater amounts of the triisooctyl phosphite than 16 pounds per acre is limited by the resultant damage to the corn and soya beans.

I claim:

1. As a new composition of matter, triisooctyl phosphite.

2. As a new product a composition consisting essentially of triisooctyl phosphite and having a boiling point of 161–164° C. at 0.3 mm. of mercury pressure and a specific gravity of about 0.891 at 20°/4° C.

3. A composition of matter consisting essentially of a mixture of compounds of the general formula $$(RCH_2O)_3P$$

in which R is a heptyl radical branched in one of the 3, 4 and 5 positions.

4. As a preemergence herbicide, an emulsion comprising a mixture of compounds of the general formula $$(RCH_2O)_3P$$

in which R is a heptyl radical branched in one of the 3, 4 and 5 positions, a volatile organic solvent and an emulsifying agent, said emulsion containing about 25% of said compound.

References Cited in the file of this patent

UNITED STATES PATENTS

| | | |
|---|---|---|
| 2,370,786 | Fox | Mar. 6, 1945 |
| 2,408,744 | Engel | Oct. 8, 1946 |
| 2,485,341 | Wasson et al. | Oct. 18, 1949 |
| 2,631,162 | Ladd et al. | Mar. 10, 1953 |

OTHER REFERENCES

Davy: Ind. and Eng. Chemistry, September 1950, page 1842.